July 26, 1955
G. HILL ET AL
2,713,880
CAKE SLICING MACHINE HAVING A RECIPROCATING PLUNGER
Filed Oct. 3, 1951
6 Sheets-Sheet 1
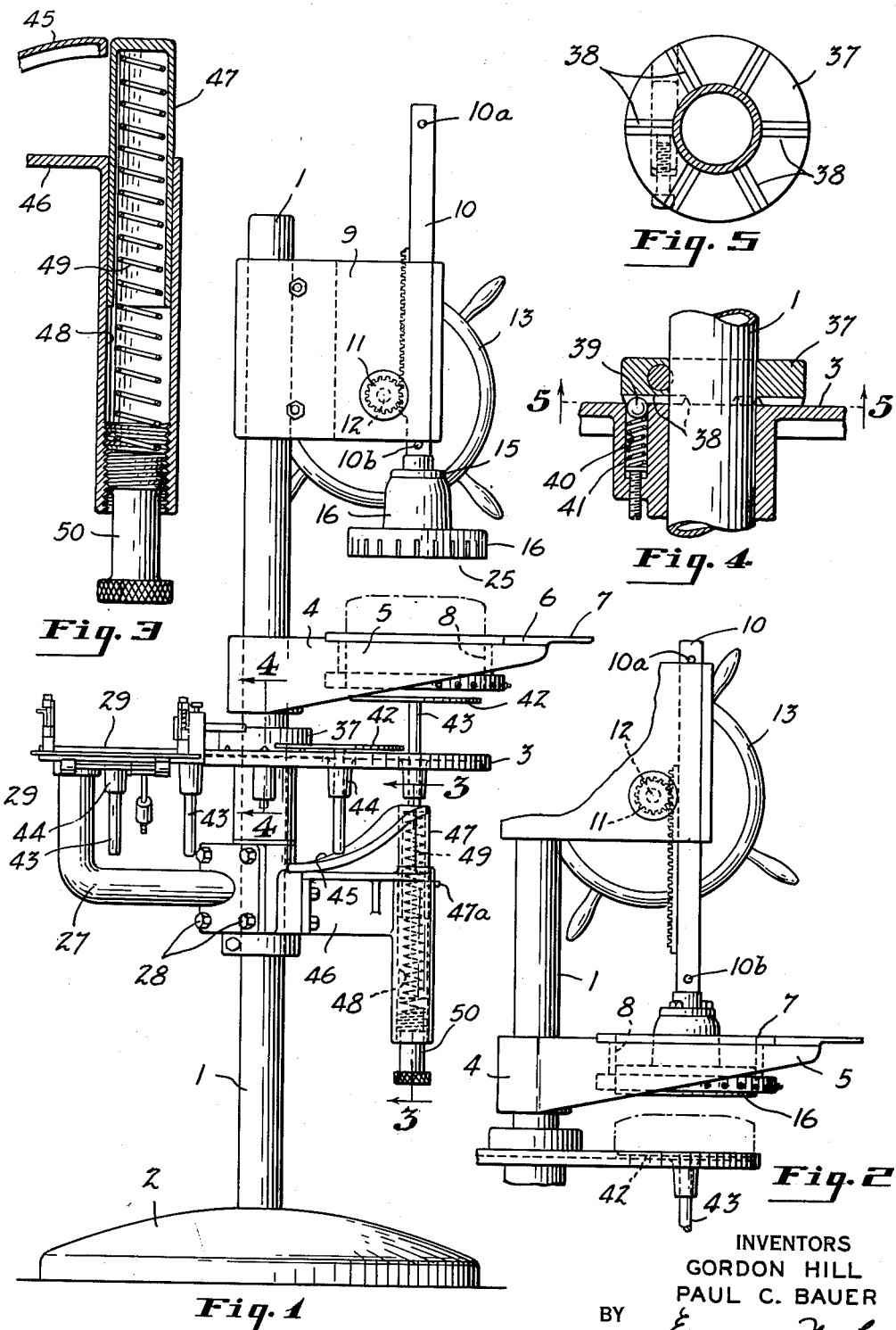
INVENTORS
GORDON HILL
PAUL C. BAUER
BY Evans + McCoy
ATTORNEYS

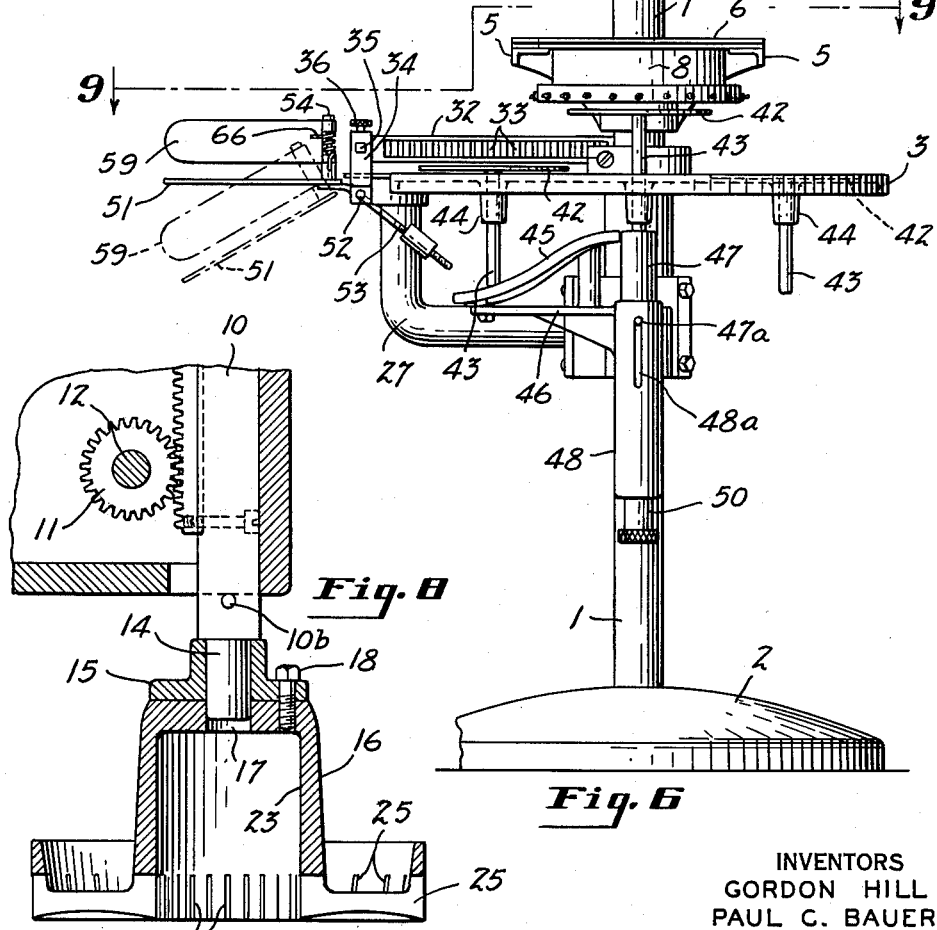

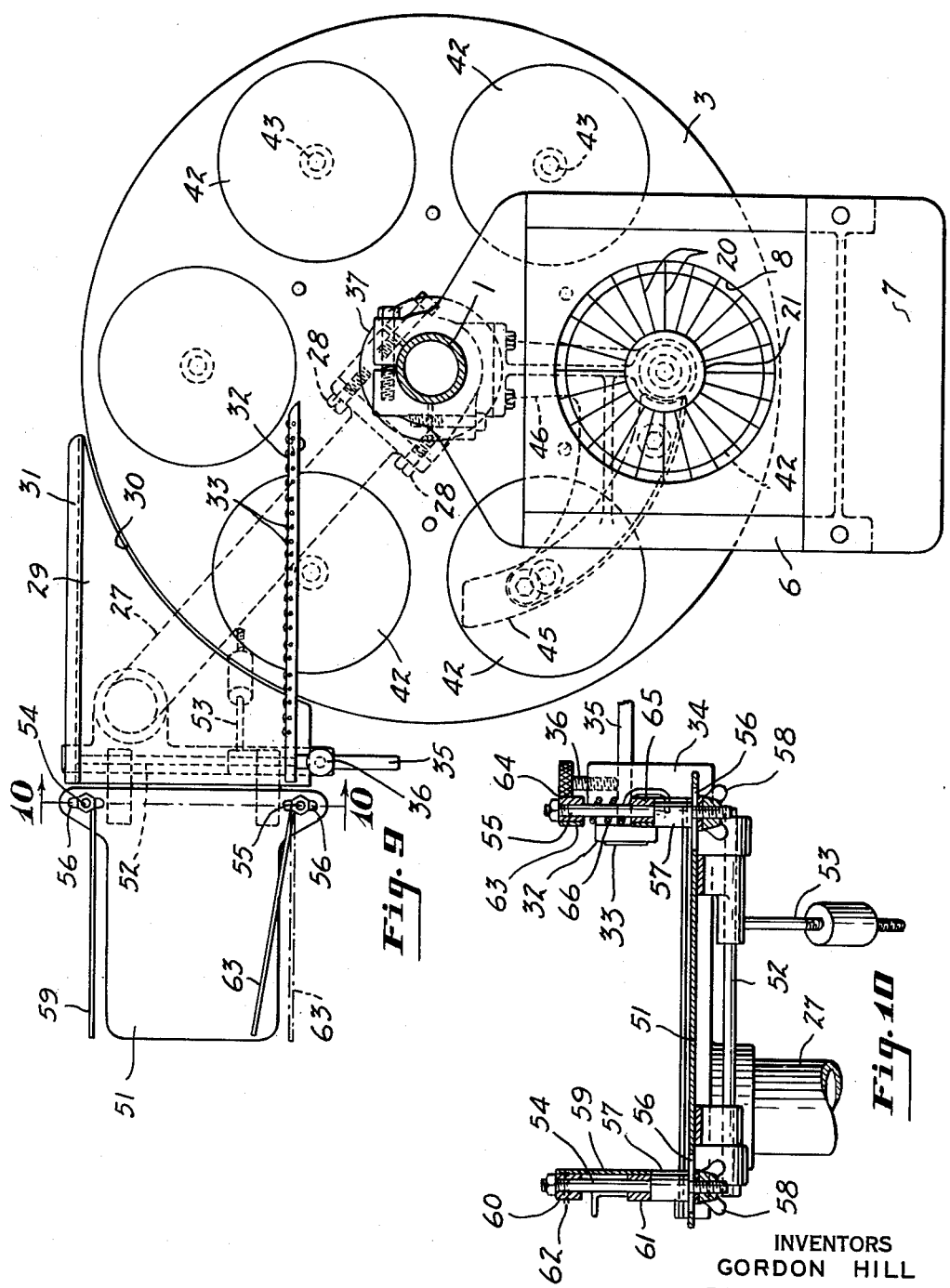

July 26, 1955
G. HILL ET AL
2,713,880
CAKE SLICING MACHINE HAVING A RECIPROCATING PLUNGER
Filed Oct. 3, 1951
6 Sheets-Sheet 4
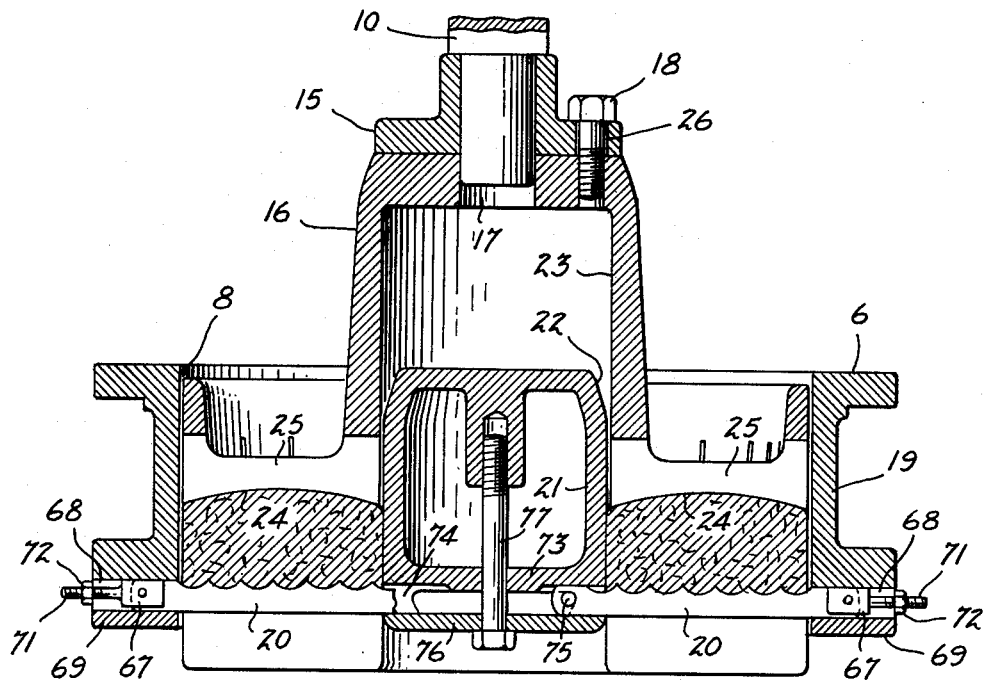
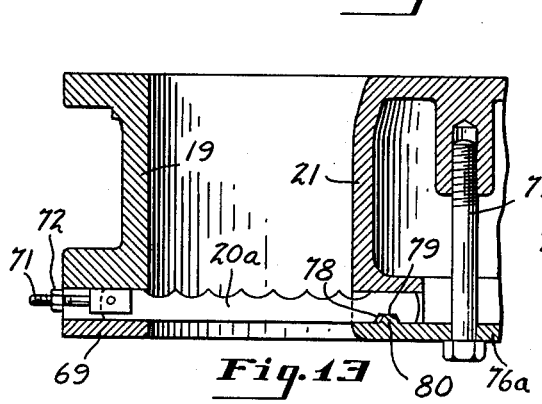
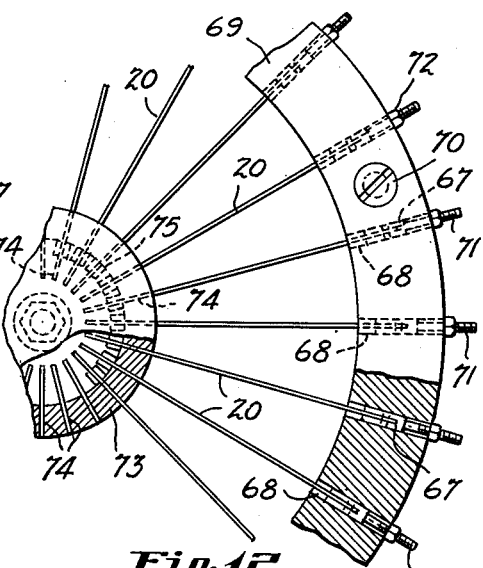
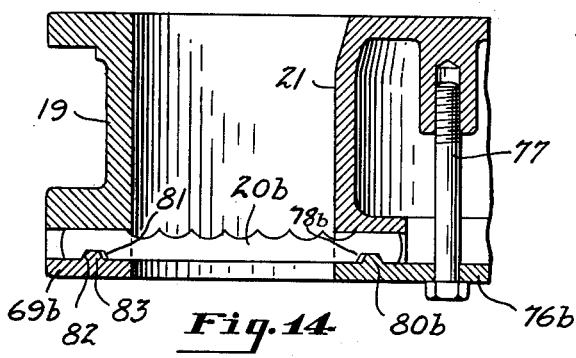
INVENTORS
GORDON HILL
PAUL C. BAUER
BY Evans + McCoy
ATTORNEYS July 26, 1955    G. HILL ET AL    2,713,880
CAKE SLICING MACHINE HAVING A RECIPROCATING PLUNGER
Filed Oct. 3, 1951    6 Sheets-Sheet 5
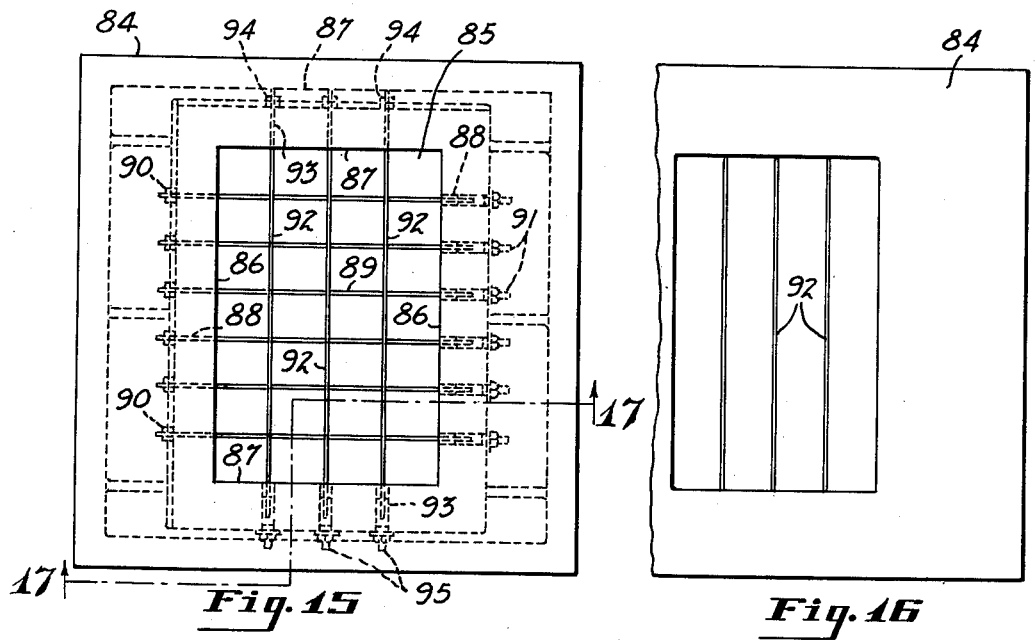
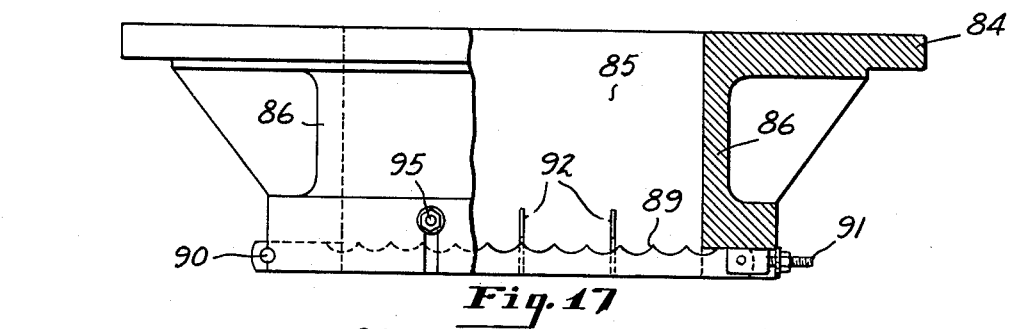
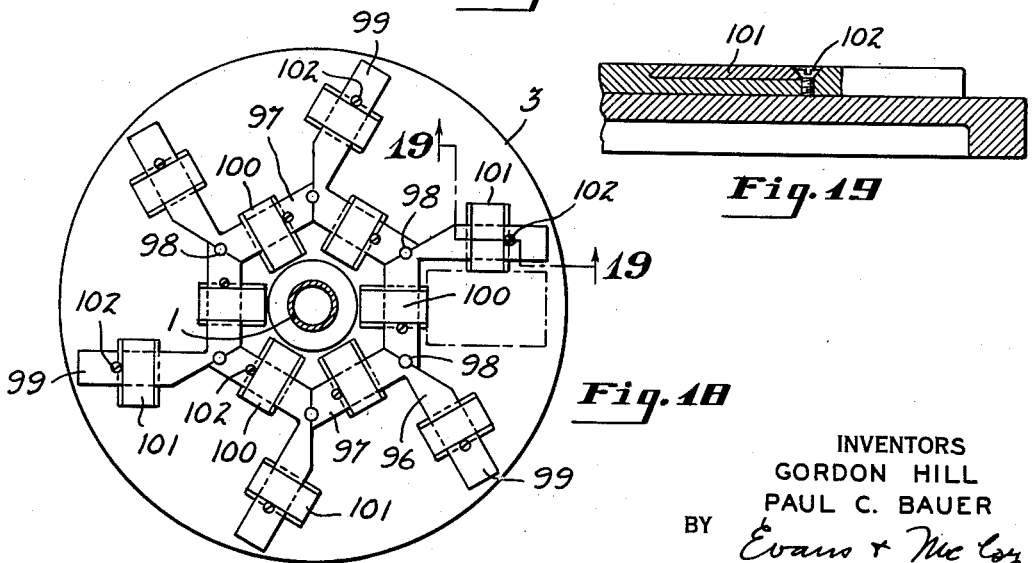
INVENTORS
GORDON HILL
PAUL C. BAUER
BY Evans + McCoy
ATTORNEYS

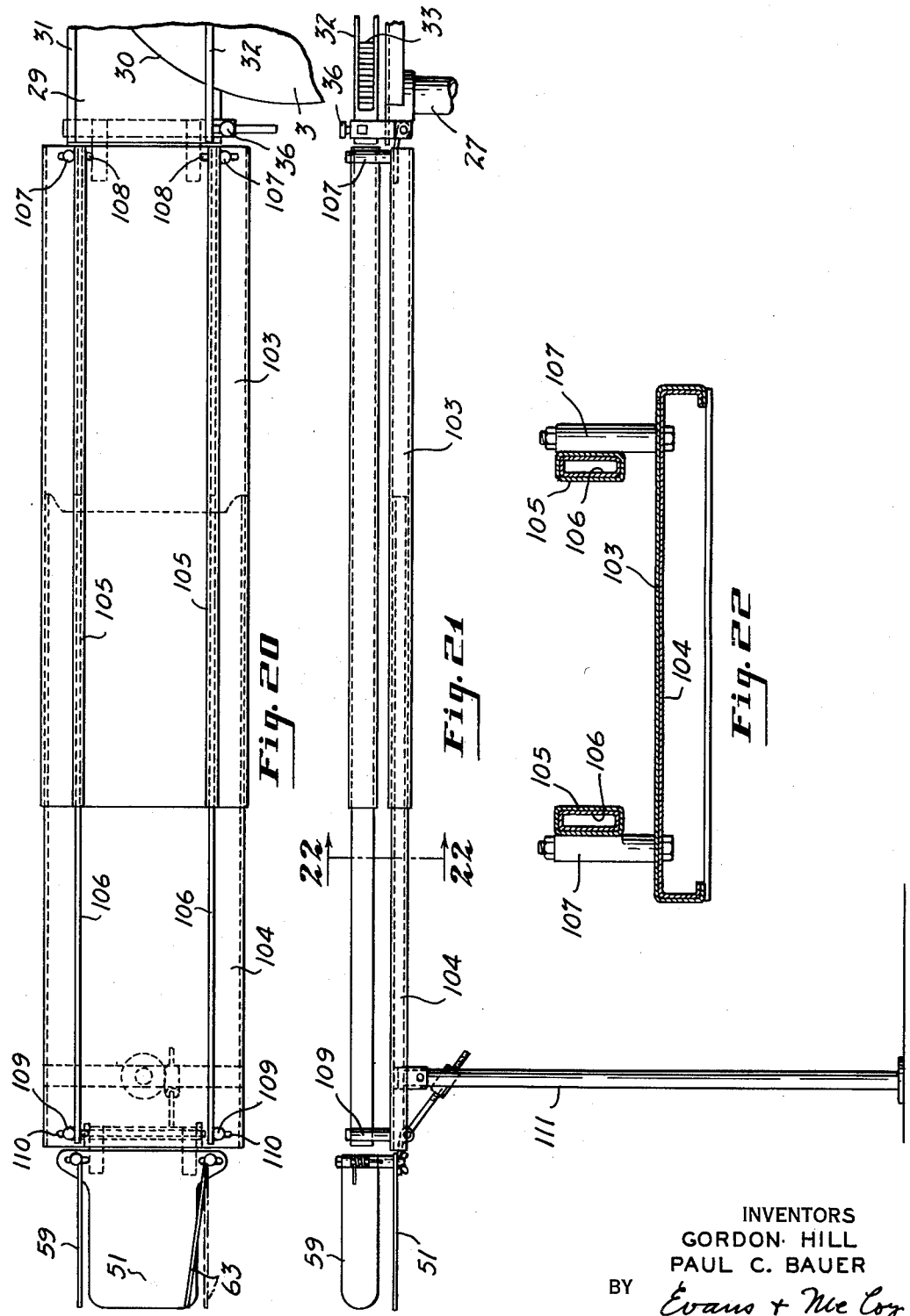

United States Patent Office 2,713,880
Patented July 26, 1955

2,713,880

CAKE SLICING MACHINE HAVING A RECIPROCATING PLUNGER

Gordon Hill, Bettendorf, and Paul C. Bauer, Davenport, Iowa, assignors, by mesne assignments, to Bettendorf Bakery Equipment Company, Bettendorf, Iowa, a corporation of Iowa Application October 3, 1951, Serial No. 249,501

13 Claims. (Cl. 146—169)

This invention relates to cake slicing machines and particularly to a machine for slicing and packaging cakes of the fruit cake type.

In a machine of the present invention cakes are sliced by forcing them through a set of spaced knives by means of a plunger. The knives form the bottom of a cake receiving well which is shaped to conform with the cake to be sliced and the plunger is shaped to fit in the well and is mounted for movement into and out of the well, the bottom face of the plunger being provided with spaced slots which register with the slicer blades and which are of a depth to receive the blades so that the plunger can force the cake entirely through the blades. Sliced cakes are received in suitable trays on a turntable beneath the cake receiving well and are conveyed by the turntable to a discharge runway where means is provided for packaging the sliced cakes. In order to effect transfer of cakes of different heights from the slicer to the turntable without a gravity drop, individual cake supports are provided on the turntable which are individually vertically movable and which are yieldably supported in an elevated cake receiving position beneath the slicer blades.

The machine is designed to handle cakes of various shapes and sizes, both the well and the plunger being easily detachable so that they can be replaced with other plungers and wells which conform to cakes of different sizes and shapes.

The invention has for its object to provide a simple and inexpensive machine for expeditiously slicing and packaging cakes of various sizes.

Reference should be had to the accompanying drawings forming a part of this specification in which:

Figure 1 is a side elevation of a machine embodying the invention;

Fig. 2 is a fragmentary side elevation of the upper portion of the machine showing the plunger in its lowermost position and showing a sliced cake which has been discharged from the well onto the turntable;

Fig. 3 is an enlarged fragmentary vertical section taken on the line indicated at 3—3 in Fig. 1;

Fig. 4 is an enlarged fragmentary vertical section taken on the line indicated at 4—4 in Fig. 1;

Fig. 5 is a horizontal section taken on the line indicated at 5—5 in Fig. 4, showing the bottom face of the indexing collar;

Fig. 6 is a front elevation of the machine;

Fig. 7 is an enlarged bottom plan view of the plunger viewed as indicated at 7—7 in Fig. 6;

Fig. 8 is an enlarged vertical section through the plunger taken on the line indicated at 8—8 in Fig. 6;

Fig. 9 is an enlarged horizontal section taken on the line indicated at 9—9 in Fig. 6, showing the cake receiving well and turntable in plan;

Fig. 10 is an enlarged vertical section taken on the line indicated at 10—10 in Fig. 9;

Fig. 11 is a transverse vertical section on an enlarged scale through the cake receiving well and plunger;

Fig. 12 is a fragmentary bottom plan view of the well shown in Fig. 11;

Fig. 13 is a fragmentary vertical section showing a modified mounting for the slicer blades;

Fig. 14 is a section similar to Fig. 13 showing another blade mounting;

Fig. 15 is a bottom plan view of a cake receiving well of rectangular form provided with crossing slicer blades;

Fig. 16 is a fragmentary top plan view of a cake receiving well such as shown in Fig. 14 with one set of blades only;

Fig. 17 is an enlarged vertical section taken on the broken line indicated at 17—17 in Fig. 15;

Fig. 18 is a plan view of a turntable with adjustable members thereon for positioning a cake of rectangular form;

Fig. 19 is an enlarged fragmentary vertical section taken on the line indicated at 19—19 in Fig. 18;

Fig. 20 is a top plan view of an extensible runway which may be provided to receive sliced cakes from the turntable;

Fig. 21 is a side elevation of the runway shown in Fig. 20; and

Fig. 22 is an enlarged vertical transverse section through the runway taken on the line indicated at 22—22 in Fig. 21.

The machine of the present invention is mounted on a pedestal consisting of a vertical standard 1 and a base 2. The standard 1 has a turntable 3 rotatably mounted thereon and above the turntable a bracket 4 is attached to the standard and carries parallel horizontal arms 5 which receive a removable and replaceable shelf 6 that has a flat top 7 on which a cake may be placed and a cake receiving well 8 which is positioned between the arms 5. The shelf and cake receiving well form a removable unit which has sliding engagement with the arms 5 and which can be readily replaced with another unit having a cake well of different size or shape.

A housing 9 is attached to the standard 1 above the bracket 4 and is positioned to overlie the cake well supported on the bracket 4. A vertically movable rack bar 10 is slidably mounted in the housing 9 and is moved up or down in the housing by means of a pinion 11 on a horizontal shaft 12 extending through the housing 9 and having a handwheel 13 attached thereto. Stop pins 10a and 10b on the bar 10 engage with the housing 9 to limit upward and downward movements of the bar. The rack bar 10 has a lower end 14 of reduced diameter to which a flanged collar 15 is secured. A plunger 16 of a size and shape to fit in the cake receiving well 8 is attached to the lower end of the rack bar 10, the plunger 16 having a centering opening 17 in which the reduced lower end 14 of the rack bar fits and being detachably secured to the flanged collar 15 by means of bolts 18 which extend through arcuate slots in the collar 15 which permit angular adjustment of the plunger.

The cake receiving well as illustrated in Figs. 10 and 11 is of annular form having an outer vertical wall 19 of internally cylindrical form. The cake supporting bottom of the well is formed of angularly spaced radially disposed blades 20 which are attached to the outer wall 19 and to a center post 21 which is substantialy of externally cylindrical form to provide an inner wall opposed to the outer wall 19, the post 21 having a tapering upper end 22 to facilitate the entry of the cake into the well.

The plunger 16 is shaped to substantially fit within the outer wall 19 of the cake well and is provided with a central recess 23 to receive the center post 21, the recess 23 being of a depth sufficient to permit the plunger to move to the bottom of the cake receiving well. The plunger 16 has a transversely concave cake engaging bottom face 24 that is provided with radial slots 25 which register with the radial blades 20 and which are of a depth greater than the heights of the blades 20 so that the plunger can push the cakes entirely through the slicer blades.

In order to assure accurate alinement of the slots of the plunger with the slicer blades, the flanged collar 15 is provided with arcuate slots 26 through which the attaching bolts 18 extend. In securing the plunger to the collar 15 the plunger may be positioned in the cake receiving well with the radial blades 20 positioned in its slots and may be secured in proper position on the vertically movable rack bar by tightening the bolts 18.

Below the turntable 3 a laterally extending supporting arm 27 is detachably secured to the standard 1 by means of bolts 28. The arm 27 extends outwardly past the periphery of the turntable 3 and provides a support for a discharge runway 29. The runway 29 is preferably in the form of a flat table having an arcuate edge 30 alongside the periphery of the turntable 3 and has parallel guide rails 31 and 32 attached thereto. The outer guide rail 31 is tangential to the turntable 3 and the inner guide rail 32 extends over the surface of the turntable 3 parallel to the bar 31. The space between the guide rails 31 and 32 is sufficient to accommodate the cake being sliced by the machine and as the cake engages with the guide rail 32 it is guided onto the runway 29 between the rails 31 and 32. To reduce frictional drag the inner guide rail 32 is preferably provided with vertically disposed cake engaging rollers 33. The inner guide rail 32 is supported at its outer end on a post 34 on the runway 29 by means of a laterally extending arm 35 that is slidable in the post 34 and that is held in adjusted position by means of a screw 36.

After each cake slicing operation the turntable 3 is turned through an angle sufficient to carry a sliced cake past the bottom of the cake well and suitable indexing means is provided for determining the extent of such angular movements and for holding the turntable in a fixed position during the slicing operation.

As best shown in Fig. 4, the standard 1 has a collar 37 attached thereto immediately above the turntable 3 and this collar is provided on its under face with a series of regularly spaced, radially extending V-shaped grooves 38. A ball detent 39 mounted in a vertical socket 40 provided in the turntable beneath the collar 37 is pressed against the under face of the collar 37 by a coil spring 41. The detent 39 engages successively in the grooves 38, the angular spacing of the grooves 38 determining the extent of angular movement imparted to the turntable after each slicing operation, and the engagement of the ball 39 in the grooves 38 serving to yieldably hold the turntable in fixed position during each slicing operation. The turntable is preferably turned by hand after each cake slicing operation through an angle corresponding to the angular spacing of the grooves 38. The turntable 3 is spaced below the bottom of the cake well 8 a distance greater than the height of the cakes being sliced to permit the cakes to move with the turntable out from under the cake well.

Each cake is ordinarily delivered into a shallow tray on the turntable and, in order to insure proper positioning of the sliced cakes in the trays, cake receiving supports are provided on the turntable which are adapted to be lifted to a receiving position closely adjacent the bottom of the cake well prior to the delivery of a sliced cake thereto. The cake supports are in the form of individual platforms 42 which may be shaped to conform substantially to the shape of the cakes being sliced and which are supported upon vertical stems 43 which extend downwardly from the center of each platform 42. The stems 43 extend through the turntable 3 and are slidably supported in bosses 44 that project downwardly from the under side of the turntable 3. The platforms 42 are normally supported in shallow recesses in the top face of the turntable 3 with their top faces flush with the top face of the turntable 3 so that cakes supported thereon can be readily transferred by the guide rails 32 from the turntable to the discharge runway 29.

For lifting the platforms 42 an inclined cam track 45 is mounted on a bracket 46 attached to the standard 1 beneath the turntable. The bottom ends of the stems 43 engage the top face of the cam 45 and ride up the cam as a turntable is turned to lift the platform 42 to a position closely adjacent the bottom of the well 8. The upper end of the cam 45 is beneath the central portion of the well 8 and the stems 43 pass from the upper end of the cam 45 onto the top of a yieldably supported plunger 47 which is centered with respect to the cake well and which serves to yieldably support the platform 42 in cake receiving position beneath the cake well.

As shown in Fig. 3, the plunger 47 is an inverted cup-shaped cylindrical member that slides in a cylindrical socket 48 carried by the bracket 46. The plunger 47 is supported by a long coil spring 49 within the socket 48 and plunger 47, the spring 49 being sufficiently yieldable to permit the platform 42 to be moved downwardly substantially to its turntable engaging position under the weight of a cake deposited thereon. In order to adjust the spring 49 to provide the desired yieldability for cakes of different sizes and weights, the lower end of the spring 49 rests on a screw plug 50 at the lower end of the socket 48. To insure proper positioning of the plunger 47 with respect to the upper end of the cam 45 the plunger 47 has a pin 47a that engages in a vertical slot 48a in the cylindrical socket 48.

In the operation of the machine a cake placed in the well 8 is forced through the slicer blades 20 by the plunger 16, the bottom of the cake moving into a tray on the platform 42 and the platform 42 being moved downwardly as the cake is forced through the slicer blades. When the cake is completely sliced and discharged from the well 8 the weight thereof compresses the spring 49 sufficiently to move the platform 42 down far enough to provide clearance between the top of the cake and the bottom of the well 8. Turning movement of the turntable causes the stem 43 to ride off the plunger 47, permitting the plunger 47 to return to its uppermost position and permitting the platform 42 to move to its lowermost position in engagement with the top of the turntable 3.

At the discharge end of the runway 29 a bagging chute 51 is provided which is pivoted on a horizontal shaft 52 supported beneath the delivery end of the runway 29. The chute 51 is normally counterbalanced and held in horizontal position by means of a weighted arm 53, the counterbalancing being so adjusted that the chute 51 will be tilted by the weight of a cake.

Adjacent its receiving end the bagging chute 51 has vertical posts 54 and 55 mounted thereon and adjustable laterally in transverse slots 56. The posts 54 and 55 are in the form of bolts having collars 57 fixed thereto which rest upon the top face of the chute 51. The threaded lower ends of the posts extend through the slots 56 and the posts are clamped to the chute by means of wing nuts 58 on the posts which engage with the bottom face of the chute.

The outer post 54 carries a bag holding arm 59 formed of spring metal which extends along the outer edge of the chute 51. The arm 59 is attached to collars 60 and 61 on the post 55 and is held against turning movement on the post by means of a pin 62 extending through the collar 60.

The post 55 supports an inner yieldable bag holding arm 63 which is attached to collars 64 and 65 rotatably mounted on the post 55. The outer end of the arm 63 is yieldably supported by means of a spring 66 attached at one end to a fixed collar 67 and at its opposite end to the collar 64 attached to the arm 63. The spring 66 permits the arm 63 to swing inwardly toward the arm 59 to facilitate the placing of the open end of a bag over the arms 59 and 63 and chute 51, the spring serving to exert an outward pressure on the arm 63 to hold the open end of the bag in cake receiving position. The cakes pass over the runway 29 onto the chute 51 and into a bag supported on the chute.

Referring to Figs. 11 and 12, each of the blades 20 has a block 67 attached to its outer end which slidably fits in a radial slot 68 in the lower edge of the outer wall 19 of the cake well. The blocks 67 are retained in the slots 68 by means of a clamping ring 69 attached to the bottom edge of the wall 19 by screws 70. Tension screws 71 attached to the blocks 67 have threaded outer ends that receive nuts 72 that engage the outer face of the wall 19.

The center post 21 is provided with a dependent marginal flange 73 that is provided with radial blade receiving slots 74. The inner ends of the slicer blades have pins 75 attached thereto which engage with the inner face of the flange 74 to anchor the inner ends of the blades. The blades 20 are tensioned by means of the nuts 72 and support the center post 21. The blades are retained in the slots 74 of the center post by means of a clamping disk 76 that is secured to the post by means of a central bolt 77.

Fig. 13 shows a modified blade mounting in which a slicer blade 20a is provided adjacent its inner end with a notch 78 in its bottom edge. The notch 78 has an inclined inner edge 79 that engages with a rib 80 on the upper face of a central clamping disk 76a. The blade 20a is anchored at its inner end by means of the rib 80 and is provided at its outer end with a tensioning screw 71 and nut 72.

In Fig. 14 another mounting is shown in which a blade 20b is secured at its inner end by means of a clamping disk 76b having a rib 80b engaging in a notch 78b in the blade. At its outer end the blade has a notch 81 in its lower edge similar to the notch 78b, the notch 81 having an inclined outer edge 82 that is engaged by a rib 83 formed on the upper face of a clamping ring 69b that is secured to the bottom edge of the outer wall of the well. The inner and outer edges of the inner and outer notches of the blade 20 converge outwardly so that engagement of the ribs 80b and 83 serve to tension the blades as the clamping ring and disk are moved upwardly by adjusting the screws 70 and bolt 77.

In Figs. 15, 16 and 17 a shelf member 84 formed to fit upon the supporting arms 5 and provided with a cake receiving well 85 of rectangular form is shown. The cake well 85 is provided with opposed vertical side walls 86 and opposed vertical end walls 87. The walls 86 are provided with transverse slots 88 to receive a series of parallel spaced slicer blades 89 which are mounted in the bottom edges of the walls 86 in a manner similar to the mounting of the radial blades shown in Figs. 11 to 14, the blades 89 being held in place by means of anchoring pins 90 and tensioning screws 91. A second set of parallel blades 92 may be provided above and at right angles to the blades 89, the blades 92 being mounted in slots 93 in the bottom edges of the end walls 87, the blades 92 being held in place by means of anchoring pins 94 and tensioning screws 95.

In order to retain cakes of rectangular form in proper position on the turntable, positioning members may be provided on the turntable which prevent movement of the cakes which would put them out of alinement with the guides 31 and 32 which deflect the cake from the turntable to the discharge runway. As shown in Fig. 18, angle shaped positioning members 96 are provided, the positioning members 96 having inner arms 97 which are mitered at their ends to engage the inner arms of other positioning members and forming substantially polygonal raised portions on the turntable surface. The mitered ends of the arms 97 are recessed to receive the pins 98 which serve to hold the positioning members in place.

The positioning members have outwardly projecting arms 99 at right angles to the arms 97, the arms 99 being spaced apart far enough to receive the cake between them. The inner arms 97 have radially adjustable slides 100 thereon and the arms 99 have slides 101 which are adjustable in a direction at right angles to the direction of adjustment of the slides 100. The slides 100 and 101 are secured in adjusted positions by means of screws 102 and are adjusted so that they are positioned closely adjacent the sides of the cake well when the cake is discharged from the cake well onto the turntable. The angular spacing of the radial grooves 38 corresponds to the angular spacing of the positioning members on the turntable so that each time the spring detent 39 engages in a groove 38 the cake positioning members are properly alined with the cake receiving well.

Instead of discharging each cake directly onto the bagging chute, the discharge runway may be in the form of an extensible table such as shown in Figs. 20, 21 and 22. This table has telescopically connected bed plates 103 and 104 and telescopically connected guide rails 105 and 106. The guide rails 105 are supported on posts 107 that are adjustable laterally in transverse slots 108 adjacent the receiving end of the bed plate 103. The guide rails 106 are adjustably supported on posts 109 mounted for lateral adjustment in slots 110 formed in the bed plate 104 adjacent in its outer end. The inner bed plate 103 is preferably pivoted to the shaft 52 beneath the discharge end of the runway 29 and the extensible runway is supported in horizontal position by means of posts 111 pivoted to the outer end of the bed plate 104.

The extensible table provides a storage space for a number of cakes which may be transferred manually from the table to a suitable packaging station. If desired, a bagging chute 51 may be provided at the discharge end of the bed plate 104.

It is to be understood that in accordance with the provisions of the patent statutes, variations and modifications of the specific devices herein shown and described may be made without departing from the spirit of the invention.

What we claim is:

1. A cake cutter comprising a structure formed to provide a cake receiving well, a series of spaced slicer blades forming the cake supporting bottom of said well, a plunger movable relative to said structure into and out of said well, said plunger having a cake engaging bottom face provided with slots to receive said blades, a cake receiving turntable beneath the well and rotatably mounted to turn about an axis spaced laterally with respect to said well, a discharge runway adjoining the periphery of the turntable and spaced laterally of said well, and means for shifting articles from the turntable to said runway.

2. A cake cutter comprising a structure formed to provide a cake receiving well, a series of spaced slicer blades forming the cake supporting bottom of said well, a plunger movable relative to said structure into and out of said well, said plunger having a cake engaging bottom face provided with slots to receive said blades, a cake receiving turntable beneath the well and rotatably mounted to turn about an axis spaced laterally with respect to said well, a discharge runway adjoining the periphery of the turntable and spaced laterally of said well, means for shifting articles from the turntable to said runway, and means including a yielding detent for releasably holding said turntable in various angular positions.

3. A cake cutter comprising a structure formed to provide a cake receiving well, a series of spaced slicer blades forming the cake supporting bottom of said well, a plunger shaped to fit in said well and mounted for vertical movement from a position at a distance above the top of the well greater than the height of a cake to be sliced into the well to force a cake through the slicer blades, a turntable underlying said well at a distance from the bottom thereof greater than the height of a cake to be sliced, a discharge runway adjacent the periphery of the turntable, and a guide member attached to said runway and overlying the turntable for deflecting cakes from the turntable to the runway.

4. A cake cutter comprising a structure formed to provide a cake receiving well, a series of spaced slicer blades forming the cake supporting bottom of said well, a plunger shaped to fit in said well and mounted for vertical movement from a position at a distance above the top of the well greater than the height of a cake to be sliced into the well to force a cake through the slicer blades, a turntable underlying said well at a distance from the bottom thereof greater than the height of a cake to be sliced, a discharge runway adjacent the periphery of the turntable, and a guide member attached to said runway and overlying the turntable for deflecting cakes from the turntable to the runway, said guide member comprising a series of closely spaced vertically disposed rollers.

5. A cake cutter comprising a standard, a housing attached to said standard, a bracket attached to said standard below said housing, a cake receiving well mounted in said bracket and having a bottom composed of spaced slicer blades, a plunger carried by said housing and formed to fit in said well, said plunger being mounted for vertical movement into the well to force a cake through said slicer blades, means for actuating said plunger, a turntable rotatably mounted on said standard and extending beneath said well to receive sliced cakes from said well, a discharge runway adjacent the periphery of said turntable laterally of said well, and means for shifting sliced cakes from said turntable to said runway.

6. A cake slicer comprising a standard, a turntable rotatably mounted on said standard, a bracket mounted on the standard above the turntable, a cake receiving well carried by said bracket, said well being shaped to conform to the cake to be sliced and having a cake supporting bottom composed of spaced slicer blades, said bottom overlying said turntable and spaced therefrom a distance greater than the height of the cakes to be sliced, a housing carried by the standard above said bracket, a plunger mounted in said housing for vertical movement, said plunger being shaped to fit in said well and being movable into said well to force a cake through said blades, a series of circumferentially spaced cake supporting platforms on said turntable, each mounted for vertical movement, indexing means for releasably holding said turntable in positions in which the said platforms are successively positioned beneath said well, means controlled by turning movements of said turntable for lifting each platform as it moves to a position beneath said well, and means for yieldingly supporting each platform beneath the well.

7. A cake slicer comprising a well shaped to conform to a cake to be sliced and having a bottom composed of spaced slicer blades, a plunger shaped to substantially fit in said well and mounted for movement into said well to force a cake through said blades, a turntable underlying said well to receive sliced cakes discharged through the bottom of the well, said turntable being spaced beneath said blades a distance greater than the height of a cake to be sliced, a series of circumferentially spaced cake receiving platforms mounted for vertical movement on the turntable, said platforms being normally supported with their top surfaces substantially flush with the top surface of the turntable, means controlled by turning movements of said turntable for lifting each platform to a position close to the bottom of said well as the platform approaches a position beneath the well, and means for yieldably supporting each platform beneath said well.

8. A cake slicer comprising a well shaped to conform to a cake to be sliced and having a bottom composed of spaced slicer blades, a plunger shaped to substantially fit in said well and mounted for movement into said well to force a cake through said blades, a turntable underlying said well to receive sliced cakes discharged through the bottom of the well, said turntable being spaced from the bottom of said well a distance greater than the height of cakes being sliced, a series of cake supporting platforms carried by the turntable, each platform having a central vertically disposed stem extending through the turntable and slidably mounted therein, a cam beneath the turntable engageable with said stems to lift each platform as it approaches said well, and a yieldable vertically movable support beneath said well positioned to receive said stems from said cam.

9. A cake slicer comprising a well shaped to conform to a cake to be sliced and having a bottom composed of spaced slicer blades, a plunger shaped to substantially fit in said well and mounted for movement into said well to force a cake through said blades, a turntable underlying said well to receive sliced cakes discharged through the bottom of the well, a series of cake supporting platforms carried by the turntable, each of said platforms being mounted for vertical movement on said platform, means for normally supporting said platforms at a distance below the bottom of the well greater than the height of cakes being sliced, means including a cam operable upon turning movement of the turntable for lifting each platform as it approaches a position beneath said well, and means for yieldably supporting each platform in cake receiving position beneath said well.

10. A cake cutter comprising a cake receiving well of substantially rectangular form having vertical side walls and a cake supporting bottom comprising spaced slicer blades extending across the space between opposite side walls, a plunger for forcing cakes through said bottom shaped to fit in said well and mounted for vertical movement into and out of the well, said plunger having slots to receive said blades, a turntable underlying said well to receive sliced cakes discharged therefrom, cake positioning members on said turntable one adjustable radially and the other adjustable in a direction at right angles to the other, and means for stopping said turntable with said members substantially alined with sides of said well.

11. A cake cutter comprising a structure formed to provide an open top cake receiving well, a series of spaced slicer blades forming the bottom of the well, a plunger mounted above the well for vertical movement into and out of the well, said plunger having a cake engaging bottom face provided with slots to receive said blades, a turntable below said well, a series of cake receiving platforms on said turntable and spaced circumferentially thereof for movement successively into a cake receiving position beneath said well, a vertical stem extending downwardly from each platform centrally thereof and guided for vertical movement in said turntable, a stationary inclined cam beneath said turntable in the path of said stems for lifting each of said platforms as it approaches its cake receiving position, and a vertically movable spring supported plunger having its top positioned alongside the high end of said cam to yieldingly support each platform in its cake receiving position.

12. A cake cutter comprising a structure formed to provide an open top cake receiving well, a series of spaced slicer blades forming the bottom of the well, a plunger mounted above the well for vertical movement into and out of the well, said plunger having a cake engaging bottom face provided with slots to receive said blades, a turntable below said well, a series of cake receiving platforms on said turntable and spaced circumferentially thereof for movement successively into a cake receiving position beneath said well, a vertical stem extending downwardly from each platform centrally thereof and guided for vertical movement in said turntable, a stationary inclined cam beneath said turntable in the path of said stems for lifting each of said platforms as it approaches its cake receiving position, a vertically movable spring supported plunger having its top positioned alongside the high end of said cam to yieldingly support each platform in its cake receiving position, a discharge runway for sliced cakes, and means for transferring the sliced cakes from said platforms to said runway.

13. A cake slicer comprising a well shaped to conform to a cake to be sliced and having a bottom composed of spaced slicer blades, a plunger shaped to substantially fit in said well and mounted for movement into said well to force a cake through said blades, a turntable underlying said well to receive sliced cakes discharged through the bottom of the well, an extensible discharge runway having its receiving end adjacent the periphery of the turntable, said runway having a horizontal cake supporting bed, and a deflector overlying the turntable and extending inwardly from said runway for guiding cakes from the turntable onto said runway.

References Cited in the file of this patent

UNITED STATES PATENTS

| Number | Name | Date |
|---|---|---|
| 723,455 | French | Mar. 24, 1903 |
| 1,231,960 | Stiles | July 3, 1917 |
| 1,263,151 | Topalian | Apr. 16, 1918 |
| 1,357,829 | Anstice | Nov. 2, 1920 |
| 1,892,685 | Shoji | Jan. 3, 1933 |
| 1,916,566 | Folk | July 4, 1933 |
| 1,947,153 | Dellinger | Feb. 13, 1934 |
| 2,178,884 | Thompson | Nov. 7, 1939 |
| 2,456,327 | Sauter et al. | Dec. 14, 1948 |
| 2,495,770 | Rivet | Jan. 31, 1950 |

FOREIGN PATENTS

| Number | Country | Date |
|---|---|---|
| 21,487 | Great Britain | Nov. 27, 1900 |